US010710310B1

(12) United States Patent
Leonard et al.

(10) Patent No.: US 10,710,310 B1
(45) Date of Patent: Jul. 14, 2020

(54) MULTIPOINT CONTROLLERS FOR POWER DELIVERY TO MULTIPLE PROBES IN ULTRASONIC WELDING SYSTEMS

(71) Applicant: Dukane IAS, LLC, St. Charles, IL (US)

(72) Inventors: Charles Leroy Leonard, St. Charles, IL (US); Matthew James Dittrich, St. Charles, IL (US); Leo Klinstein, St. Charles, IL (US)

(73) Assignee: Dukane IAS, LLC, St. Charles, IL (US)

( * ) Notice: Subject to any disclaimer, the term of this patent is extended or adjusted under 35 U.S.C. 154(b) by 0 days.

(21) Appl. No.: 16/541,954

(22) Filed: Aug. 15, 2019

(51) Int. Cl.
*B23K 20/10* (2006.01)
*B29C 65/08* (2006.01)
*B29C 65/00* (2006.01)

(52) U.S. Cl.
CPC .............. *B29C 65/08* (2013.01); *B23K 20/10* (2013.01); *B29C 66/84* (2013.01); *B29C 66/90* (2013.01)

(58) Field of Classification Search
CPC ......... B29C 65/08; B29C 66/90; B29C 66/84; B23K 1/06; B23K 20/10–106
USPC .................... 228/1.1, 110.1, 102–103, 8–12; 156/73.1–73.5, 580.1–580.2
See application file for complete search history.

(56) References Cited

U.S. PATENT DOCUMENTS

| | | | |
|---|---|---|---|
| 2,995,689 A | 8/1961 | Scarpa | |
| 3,029,766 A | 4/1962 | Jones | |
| 3,559,257 A | 2/1971 | Lemelson | |
| 3,780,926 A | 12/1973 | Davis | |
| 3,825,481 A | 7/1974 | Supitilov | |
| 3,885,902 A | 5/1975 | Fujieda | |
| 4,064,462 A | 12/1977 | Goehler | |
| 4,131,505 A | 12/1978 | Davis, Jr. | |
| 4,208,001 A | 6/1980 | Martner | |
| 4,257,730 A | 3/1981 | Kawakita | |

(Continued)

FOREIGN PATENT DOCUMENTS

| | | | |
|---|---|---|---|
| EP | 0389704 A1 | 10/1990 | |
| KR | 2007108648 A | * | 11/2007 |

OTHER PUBLICATIONS

Extended European Search Report in Application No. EP 06017374.7, dated Jan. 3, 2007 (5 pages).

(Continued)

Primary Examiner — Kiley S Stoner
(74) Attorney, Agent, or Firm — Nixon Peabody LLP

(57) ABSTRACT

A system for providing power to more than one ultrasonic welding probe from M power supplies includes N multipoint units and a base. Each of the N multipoint units includes: a housing, a plurality of analog or digital inputs configured to carry distance information regarding probe distance of a plurality of ultrasonic welding probes, a dedicated high voltage input connector connectable via a high voltage cable to a dedicated high voltage output connector of one of the M power supplies, and a microcontroller. The microcontroller is configured to: direct power from the dedicated high voltage input connector to a corresponding one of the plurality of ultrasonic welding probes, and sample the distance information of the plurality of ultrasonic welding probes at a rate of at least once per millisecond. The base houses the M power supplies, wherein M and N are both integers greater than or equal to 1.

14 Claims, 10 Drawing Sheets

(56) References Cited

U.S. PATENT DOCUMENTS

| | | | |
|---|---|---|---|
| 4,277,710 A | 7/1981 | Harwood | |
| 4,401,501 A | 8/1983 | Stumpf | |
| 4,549,684 A | 10/1985 | Telly | |
| 4,696,425 A | 9/1987 | Landes | |
| 4,746,051 A | 5/1988 | Peter | |
| 4,838,639 A | 6/1989 | Morankar | |
| 4,914,290 A | 4/1990 | Hilgart | |
| 5,295,700 A | 3/1994 | Crews | |
| 5,798,599 A | 8/1998 | Harwood | |
| 5,880,580 A | 3/1999 | Johansen | |
| 6,251,203 B1 | 6/2001 | Vala | |
| 6,472,634 B1* | 10/2002 | Houston | B23K 9/0953 219/130.5 |
| 6,984,921 B1 | 1/2006 | Kosterman | |
| 7,225,965 B2 | 6/2007 | Johansen | |
| 7,475,801 B2 | 1/2009 | Johansen | |
| 7,819,158 B2 | 10/2010 | Klinstein | |
| 10,406,624 B2* | 9/2019 | Ryan | B23K 9/1006 |
| 2003/0006222 A1* | 1/2003 | Houston | B23K 9/0953 219/130.51 |
| 2004/0140302 A1* | 7/2004 | Myers | B23K 9/0253 219/130.51 |
| 2004/0232129 A1* | 11/2004 | Houston | B23K 9/1043 219/130.51 |
| 2005/0061848 A1 | 3/2005 | Johansen | |
| 2005/0127054 A1* | 6/2005 | Houston | B23K 9/091 219/130.51 |
| 2005/0189334 A1* | 9/2005 | Stava | B23K 9/092 219/130.51 |
| 2005/0242076 A1* | 11/2005 | Stava | B23K 9/1068 219/130.5 |
| 2006/0011707 A1 | 1/2006 | Johansen | |
| 2006/0037952 A1* | 2/2006 | Myers | B23K 9/093 219/130.51 |
| 2006/0213952 A1 | 9/2006 | Johansen | |
| 2007/0027570 A1* | 2/2007 | Buhler | B23H 7/02 700/162 |
| 2007/0163349 A1* | 7/2007 | Johansen | B06B 1/0261 73/584 |
| 2011/0309062 A1* | 12/2011 | O'Donnell | B23K 9/1043 219/130.1 |
| 2015/0168942 A1* | 6/2015 | Spicer | G05B 19/4065 700/160 |
| 2016/0354974 A1* | 12/2016 | Wang | B29C 66/92611 |
| 2018/0050410 A1* | 2/2018 | Mehn | B23K 9/0953 |

OTHER PUBLICATIONS

"Hex Buffers/Logic-Level Down Converters High-Performance Silicon-gate CMOS"; Motorola Semiconductor Technical Data; Motorola, Inc.; 1995 (6 pages).

Dukane Intelligent Assembly Solutions; "iQ Series—Ultrasonic Generator/Power Supply Auto" User's Manual; 2010 (58 pages).

Dukane Patented MPC* Multi-Point Control brochure; Dukane Intelligent Assembly Solutions; 2013 (2 pages).

* cited by examiner

US 10,710,310 B1

MULTIPOINT CONTROLLERS FOR POWER DELIVERY TO MULTIPLE PROBES IN ULTRASONIC WELDING SYSTEMS

TECHNICAL FIELD

The present disclosure relates to ultrasonic welding and more specifically to systems and methods for powering multiple ultrasonic welding probes.

BACKGROUND

Ultrasonic welding is an efficient means for joining component parts in manufacturing. Ultrasonic welding can be used on plastic parts and fabrics during automobile manufacturing, medical product manufacturing, and so on.

Ultrasonic manufacturing can sometimes involve the use of one or more welding probes. Each welding probe can be customized and controlled for particular welds for particular components. Welding probes need access to an ultrasonic power supply, and using a multiple probe controller, a power supply can be shared among a group of welding probes. Sharing a power supply reduces costs in a manufacturing environment. A manufacturer can save money by acquiring a minimum number of power supplies for groups of welding probes.

Sharing a power supply between multiple welding probes in a manufacturing environment may reduce costs, but it can increase complexity of connecting the power supply to the welding probes. It can also increase complexity of the manufacturing process involving the welding probes. Thus, a need exists for alternative systems and methods for sharing a power supply between multiple probes. The present disclosure is directed at solving problems related to delivering power to multiple probes and also addressing other needs.

SUMMARY

In an embodiment, the disclosure provides a system for providing power to more than one ultrasonic welding probe from M power supplies. The system includes N multipoint units, with each of the N multipoint units including: a housing, a plurality of analog inputs configured to carry distance information regarding probe distance of a plurality of ultrasonic welding probes, a dedicated high voltage input connector connectable via a high voltage cable to a dedicated high voltage output connector of one of the M power supplies, and a microcontroller. The microcontroller is configured to: direct power from the dedicated high voltage input connector to a corresponding one of the plurality of ultrasonic welding probes, and sample the distance information of the plurality of ultrasonic welding probes at a rate of at least once per millisecond. The system further includes a base housing the M power supplies, wherein M and N are both integers greater than or equal to 1. It has to be apparent to those of ordinary skill in the art, that analog inputs for distance sensors could be implemented as digital (or some field bus) type inputs for distance sensors with proper outputs.

In an embodiment, the disclosure provides a method for providing power from a first power supply of M power supplies to more than one ultrasonic welding probe coupled to a first multipoint unit of N multipoint units. The first multipoint unit is paired to the first power supply, wherein each of the N multipoint units includes at least one Ethernet port for connecting the N multiport units to the M power supplies in a network. Distance information regarding probe distance of a plurality of ultrasonic welding probes is received, via a plurality of analog inputs of the first multipoint unit. Power from the first power supply is received via a dedicated high voltage input connector of the first multipoint unit, wherein the dedicated high voltage input connector is connectable via a high voltage cable to a dedicated high voltage output connector of the first power supply. The power from the first power supply is directed to a corresponding one of the plurality of ultrasonic welding probes via a microcontroller of the first multipoint unit. The distance information of the corresponding one of the plurality of ultrasonic welding probes is sampled via the microcontroller at a rate of at least once per millisecond. M and N are both integers greater than or equal to 1.

The foregoing and additional aspects and implementations of the present disclosure will be apparent to those of ordinary skill in the art in view of the detailed description of various embodiments and/or implementations, which is made with reference to the drawings, a brief description of which is provided next.

BRIEF DESCRIPTION OF THE DRAWINGS

The foregoing and other advantages of the present disclosure will become apparent upon reading the following detailed description and upon reference to the drawings.

Figure 1A:
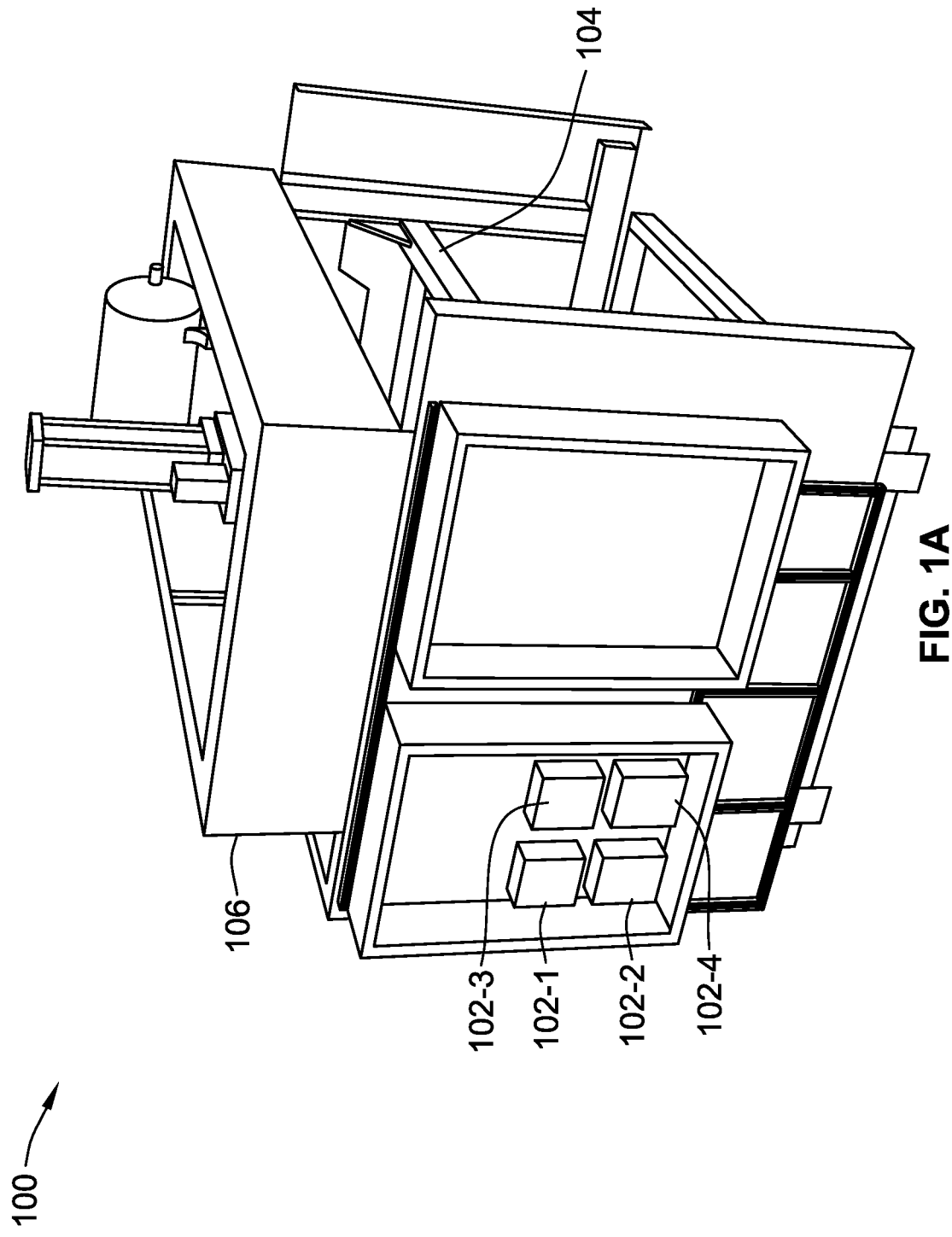
FIG. 1A illustrates a base and cassette style machine for ultrasonic welding according to an embodiment of the disclosure.

While the present disclosure is susceptible to various modifications and alternative forms, specific embodiments have been shown by way of example in the drawings and will be described in detail herein. It should be understood, however, that the present disclosure is not intended to be limited to the particular forms disclosed. Rather, the present disclosure is to cover all modifications, equivalents, and alternatives falling within the spirit and scope of the present disclosure as defined by the appended claims.

DETAILED DESCRIPTION

Figure 1B:
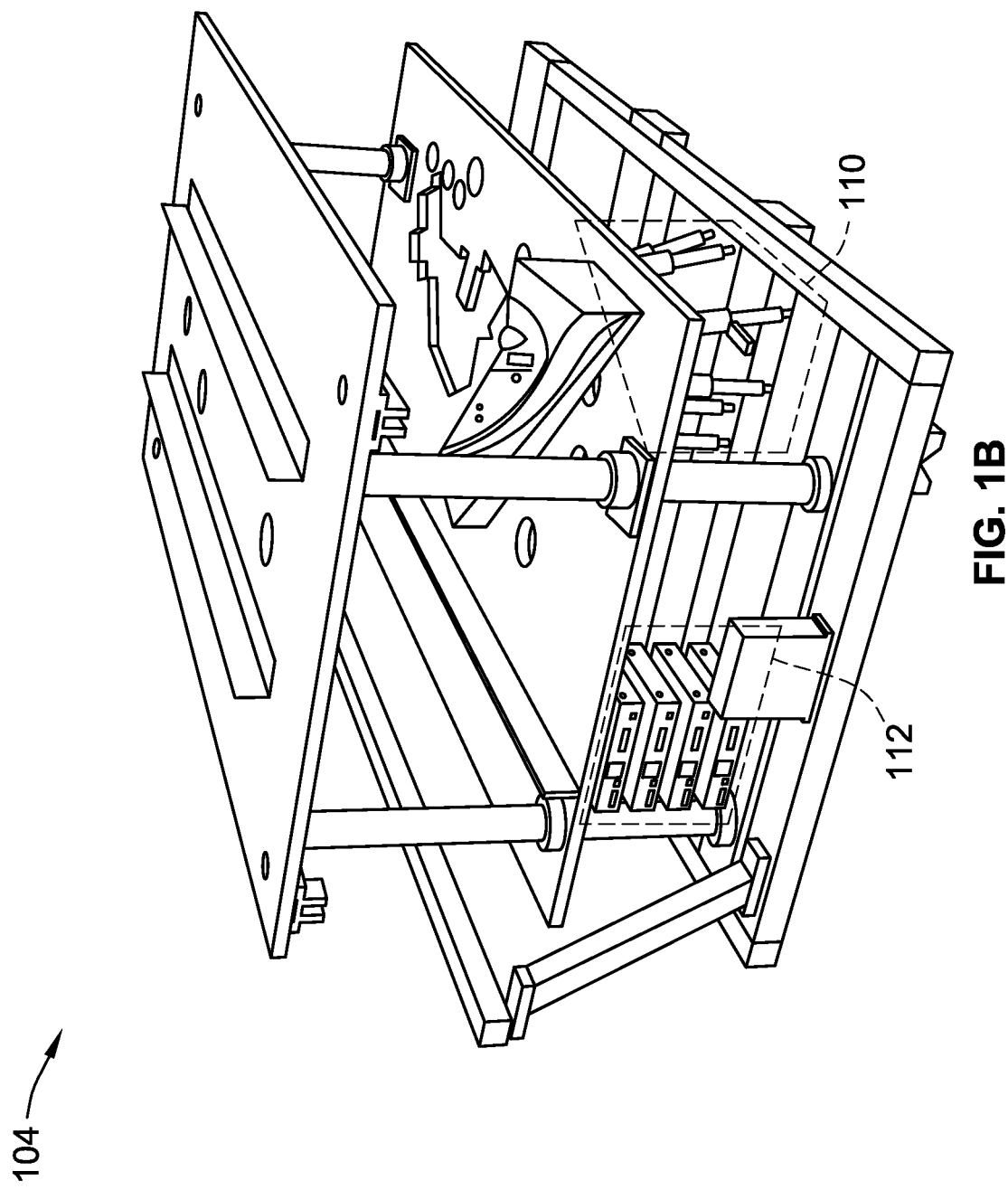
FIG. 1B illustrates a cassette from the base and cassette style machine of FIG. 1A.

Ultrasonic welders can commonly be used in "cassette" style machines, e.g., a base and cassette style machine 100 depicted in FIG. 1A. The base and cassette style machine 100 includes a base 106 straddling a cassette 104. Included on the base 106 are power supplies 102-1, 102-2, 102-3, and 102-4. FIG. 1B shows the cassette 104 without the base 106. The cassette 104 is shown to hold multiple ultrasonic welding probes 110 and several multiple probe controller units 112. A single base can hold multiple cassettes, which allows for more cost-effective manufacturing of items (e.g., high-volume plastic parts) that have distinctly different details. This cost-effective manufacturing can be applied in automotive manufacturing, for example, in manufacturing automotive door panels, spoilers, instrumentation panels, and so on.

Cassette-style machines (e.g., the base and cassette style machine 100) allow for quick exchange of cassettes (e.g., the cassette 104). A cassette-style machine can have six to twelve ultrasonic generators (e.g., the power supplies 102) in its base. The cassette-style machine can also have a corresponding number of multiple probe controller units in the cassette. The cassette can also have about eighty ultrasonic probes. The cassettes can include analog distance sensors on the ultrasonic probes for controlling the weld. The analog distance sensors are sometimes connected to an analog input/output (I/O) card which is added to a programmable logic controller (PLC) located in the base of the cassette-style machine.

Signals generated by the analog distance sensors can be sensitive to electronic noise. In conventional systems, wires connecting the analog I/O card of the PLC with the analog distance sensors must be carefully routed and shielded to protect from the electronic noise.

The base and cassette style machine 100 has the power supplies 102, the multiple probe controller units 112, and the multiple ultrasonic welding probes 110 at different locations. The multiple probe controller units 112 and the ultrasonic welding probes 110 are closer to one another than the power supplies 102 is to the multiple probe controller units 112. Quick-change connectors on the base and cassette style machine 100 can be used to connect the power supplies 102 to the multiple probe controller units 112. These quick-change connectors allow signal flow between components. Examples of signals that can flow through the connectors include high-voltage ultrasonic power signals from each power supply 102, discrete control signals, and analog signals from distance sensors.

The use of quick-change connectors introduces customization of mating connectors for both the base 106 and the cassette 104. Machine builders are required to make multiple custom cables with proper wire terminations and shielding for high electrical noise environments. These customizations can significantly add to manufacturing and troubleshooting costs. Field support and maintenance of cassette-style machines with these customizations can be cumbersome and costly.

Figure 2:
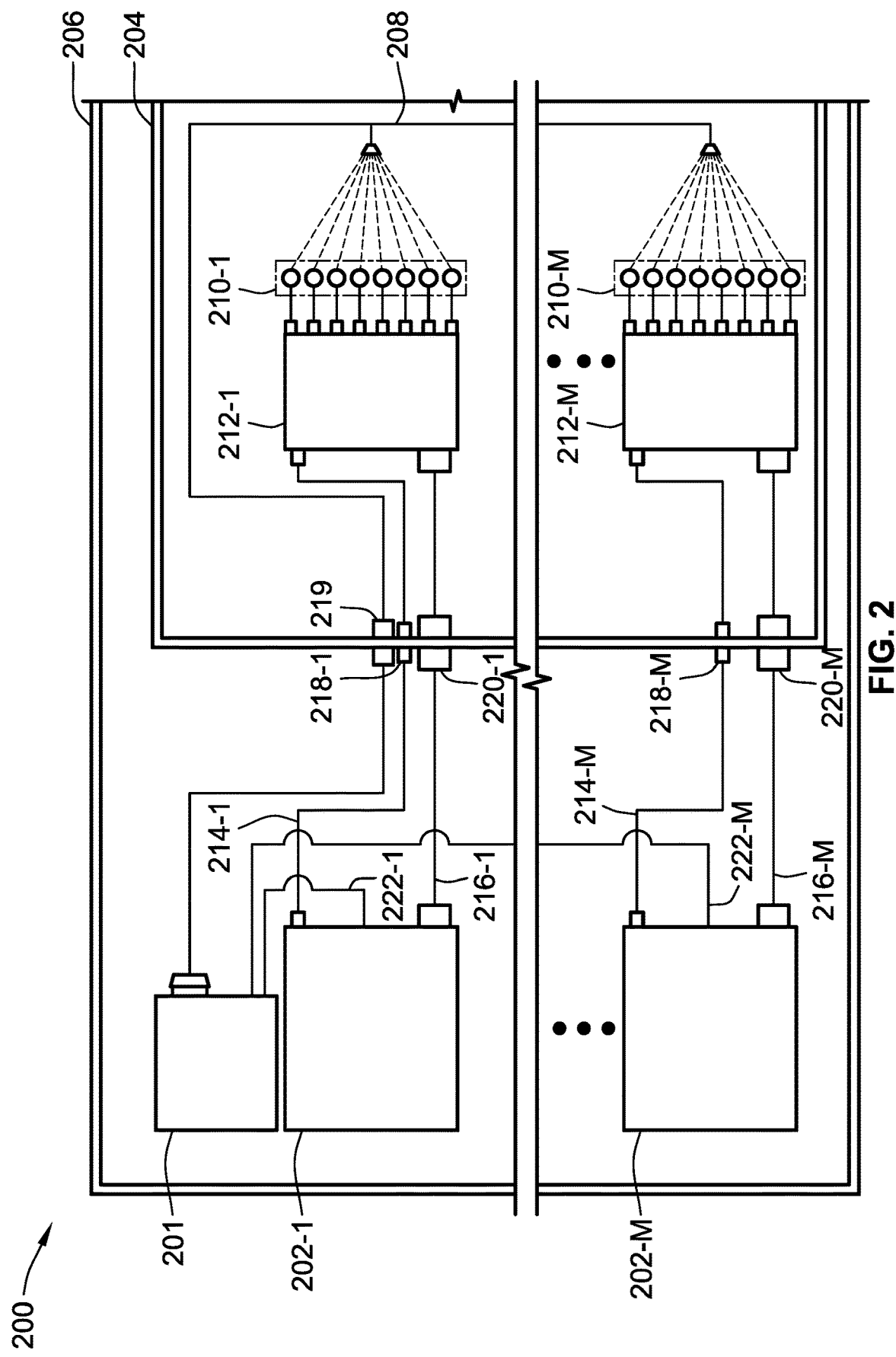
FIG. 2 is a schematic of a base and cassette style machine showing component placements for ultrasonic welding in the prior art.

To illustrate distinctions between embodiments of the disclosure and prior art, FIG. 2 provides a schematic of a base and cassette style machine 200 showing component placements for ultrasonic power supplies 202, a PLC with analog I/O cards 201, and multiple probe controller units 212 in the prior art. The PLC with analog I/O cards 201 and the ultrasonic power supplies 202 are located in the base 206 while the multiple probe controller units 212 and sets of probes 210 are located in the cassette 204.

The PLC with analog I/O cards 201 has discrete connections to each of the ultrasonic power supplies 202-1, 202-2, . . . 202-M via wires 222-1, 222-2, . . . 222-M, respectively. The wires 222-1 to 222-M allow the PLC with analog I/O cards 201 to communicate with the ultrasonic power supplies 202-1 to 202-M, and vice versa. Each of the ultrasonic power supplies 202 provides power to the sets of probes 210 via high-voltage ultrasound cables 214. The ultrasonic power supplies 202 also power the multiple probe controller units 212 via customized cables 216. Quick-change connectors 220 provide an interface between the ultrasonic power supplies 202 and the multiple probe controller units 212 for powering and communicating with the multiple probe controller units 212. Quick-change connectors 218 provide an interface between the ultrasonic power supplies 202 and the multiple probe controller units 212 for providing an ultrasound signal to the probes sets of probes 210. Each probe within each set of probe 210-1, 210-2, . . . 210-M includes actuators with analog distance sensors for communicating distance information to the PLC with analog I/O cards 201, via one or more sensor cables 208 and a quick disconnect 219.

The PLC with analog I/O cards 201 communicates with each of the ultrasonic power supplies 202-1, 202-2, . . . 202-M to perform ultrasonic welding using distance and/or position of the sets of probes 210. The PLC with analog I/O cards 201 informs the ultrasonic power supplies 202, via the wires 222, one selected probe within the set of probes 210 that should be active. A corresponding one of the ultrasonic power supplies 202 responsible for the selected probe then updates the signals on a respective customized cable 216 connected to a respective multiple probe controller unit 212 so that the one selected probe is selected by the logic in the respective multiple probe controller unit 212.

Distance and position can then be monitored using the analog distance sensor of the one selected probe to place the one selected probe within a preferred distance from the part to welded. The PLC with analog I/O cards 201 monitors the distance based on the distance information received by the analog distance sensor.

The PLC with analog I/O cards 201 then sends a signal to the corresponding one of the ultrasonic power supplies 202 to turn on an ultrasound output for providing ultrasound power to the one selected probe. The PLC with analog I/O cards 201 can then monitor the analog distance sensor and send signal to the corresponding one of the ultrasonic power supplies 202 to stop ultrasound output when a preferred reading is reached. Alternately, the weld may be controlled using Weld by Time or Weld by Energy modes, which do not require distance sensors or by the corresponding one of the power supplies 202 and the distance information is used by the PLC with analog I/O cards 201 to determine if a good weld occurred.

The PLC with analog I/O cards 201 can then read weld cycle from the corresponding one of the ultrasonic power supplies if available. The process can be repeated with a different probe output selection. A drawback to using the PLC with analog I/O cards 201 is that the PLC with analog I/O cards 201 is responsible for multiple systems and not just the welding process, and as such, the distance information being monitored by the PLC with analog I/O cards 201 can be delayed and processed later. The delay which can be upwards of 20 milliseconds can result in a poorly welded part or a very slow welding process.

In some embodiments, the disclosure provides a base and cassette style machine with multipoint controller units having analog inputs that receive distance information from distance sensors. In some embodiments, the disclosure provides Ethernet style communication in place of discrete control signals.

Figure 3:
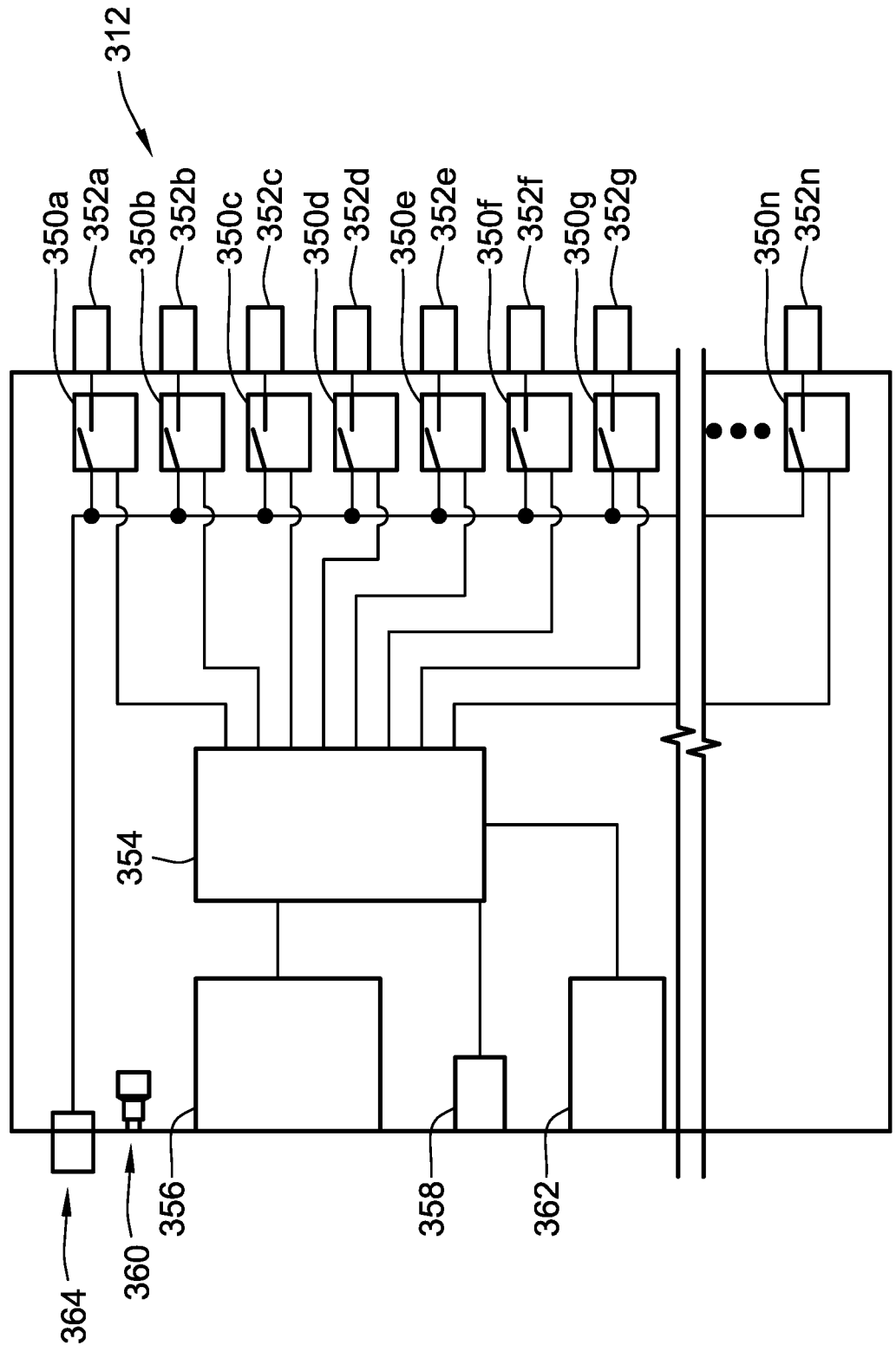
FIG. 3 is a multipoint controller unit with Ethernet according to an embodiment of the disclosure.

FIG. 3 provides a block diagram of a multipoint controller unit 312 according to embodiments of the disclosure. The multipoint controller unit 312 can include one or more high voltage relays 350 for controlling provision of high voltage ultrasound signal provided to ultrasonic probes connected to the multipoint controller unit 312. The multipoint controller unit 312 includes SHV ports 352 for interfacing with the ultrasonic probes to provide the high voltage ultrasound signal to the ultrasonic probes. The multipoint controller unit 312 includes a dedicated high voltage input connector 364 for receiving ultrasound signal from an ultrasonic power supply. The multipoint controller unit 312 includes multi-channel distance inputs 356 for receiving analog distance information from the ultrasonic probes connected to the multipoint controller unit 312.

The multipoint controller unit 312 can include a button 360 for quickly pairing the multipoint controller unit 312 to an ultrasonic power supply. The multipoint controller unit 312 can include a microcontroller 354. The microcontroller 354 can control which of the high voltage relays 350 is active to provide ultrasonic power to a specific probe. The microcontroller 354 can interpret distance information received via the multi-channel distance inputs 356 to control a welding process. The microcontroller 354 can be programmed and controlled via a USB port 358. The microcontroller 354 can communicate with an ultrasonic power supply via one or more Ethernet ports 362.

Figure 4A:
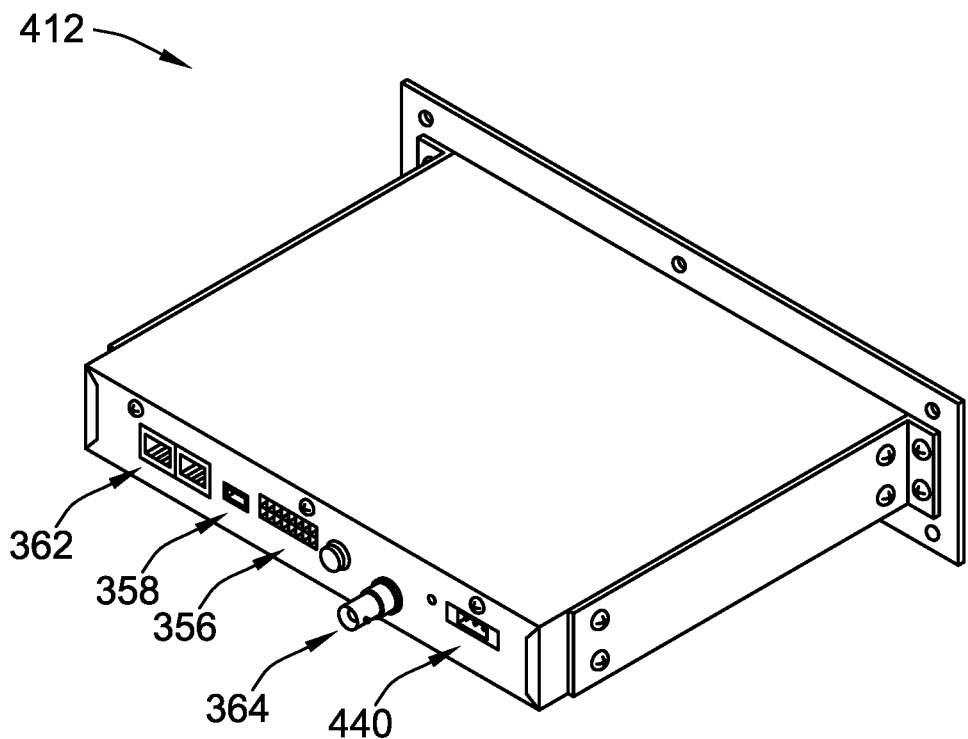
FIG. 4A is a perspective view of a multipoint controller unit according to an embodiment of the disclosure.
Figure 4B:
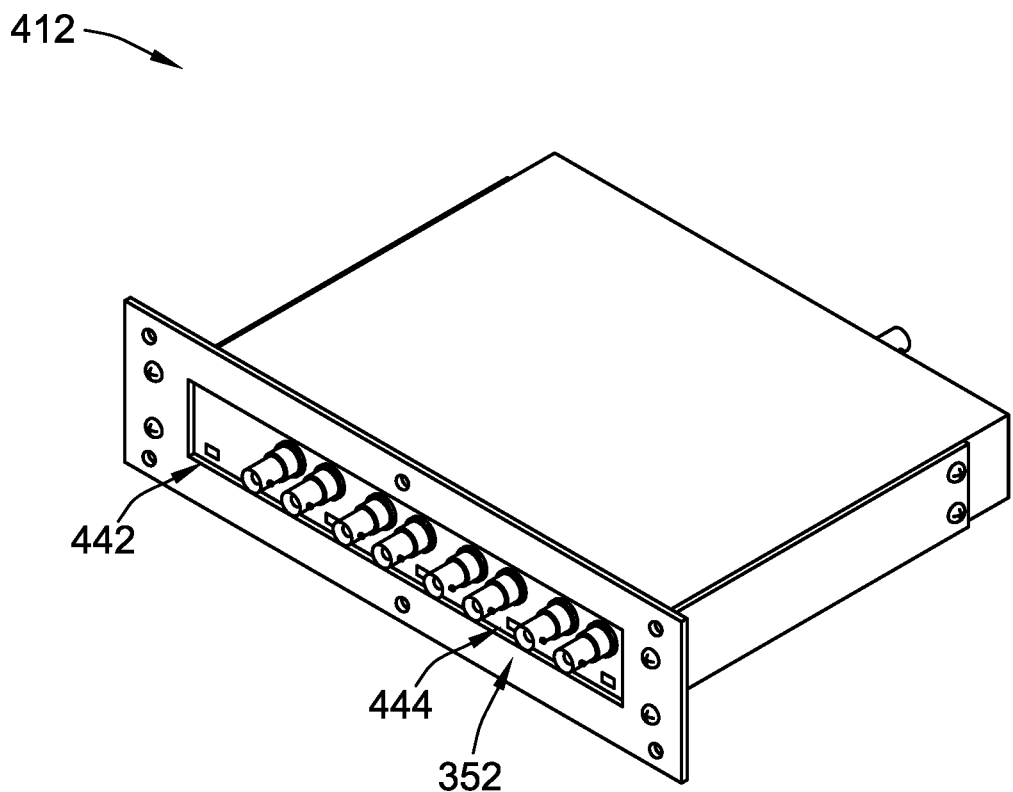
FIG. 4B is another perspective view of the multipoint controller unit of FIG. 4A.

FIGS. 4A and 4B provide perspective views of a multipoint controller unit 412 according to an embodiment of the disclosure. The multipoint controller unit 412 includes a housing with two Ethernet ports 362, the USB port 358, the multi-channel distance input port 356, a dedicated high voltage input connector 364, a power input port 440, a main power LED 442, LED indicators 444, and SHV ports 352.

The power input port 440 is a separate power port for powering electronics within the multipoint controller unit 412 such that power and communication ports of the multipoint controller unit 412 are decoupled in comparison to the multiple probe controller units 212 of FIG. 2. The multiple probe controller units 212 receive power and perform communication via the customized cables 216.

The main power LED 442 can be provided as a visual indicator of the status of the multipoint controller unit 412 on whether the multipoint controller unit 412 is receiving power via the power input port 440. The LED indicators 444 can be provided as visual indicators of which one of the multiple probes is being selected for receiving ultrasonic power.

Figure 5:
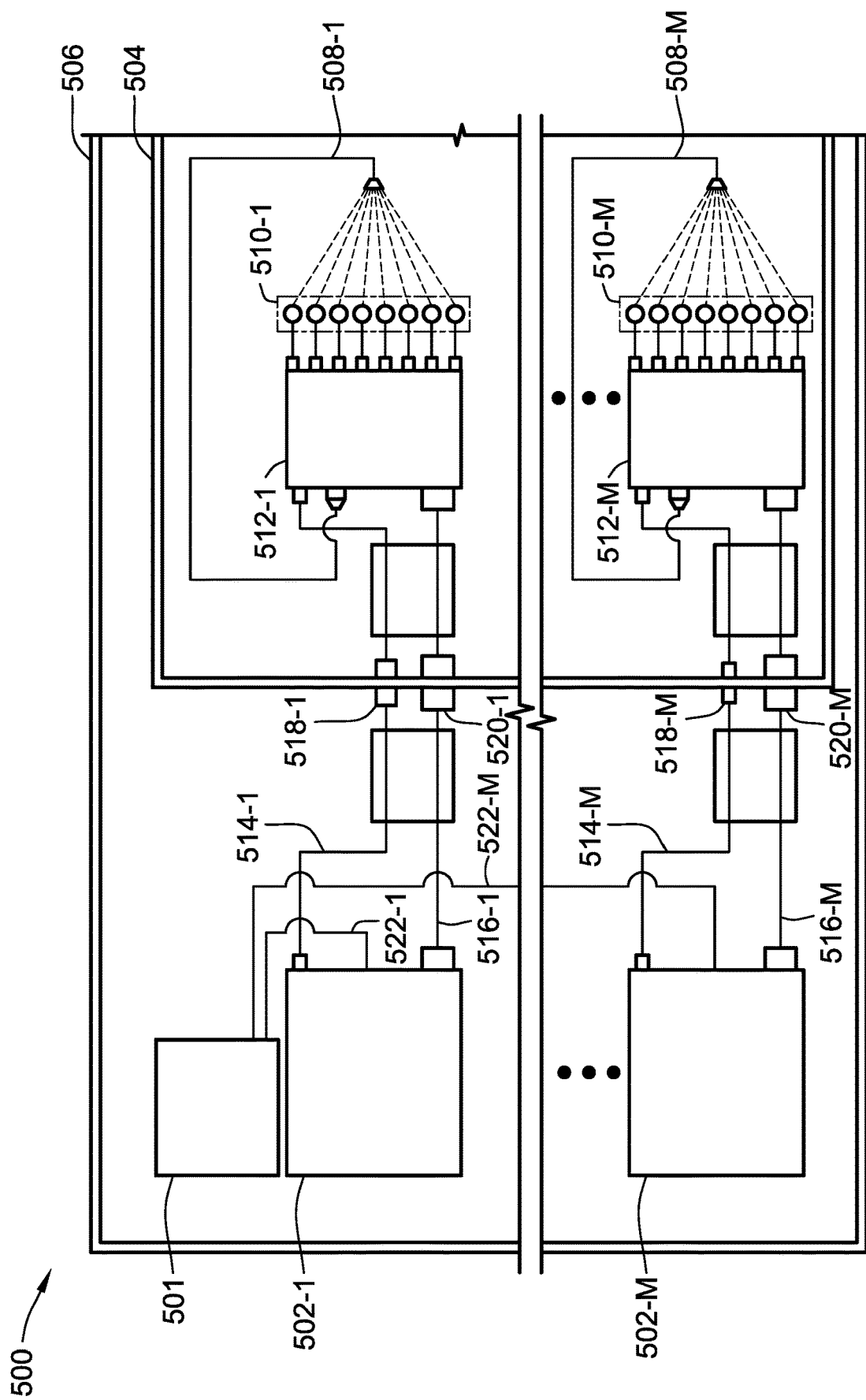
FIG. 5 is a schematic of a base and cassette style machine with multipoint controller units according to an embodiment of the disclosure.

In a base and cassette style machine (e.g., the base and cassette style machine 100), replacing the multiple probe controller unit with a multipoint controller unit (e.g., the multipoint controller unit 312) can provide architectural changes with several advantages. FIG. 5 is a schematic of a base and cassette style machine 500 with multipoint controller units 512 according to an embodiment of the disclosure. The base and cassette style machine 500 includes a base 506 and a cassette 504. The base 506 includes a PLC 501, one or more ultrasonic power supplies 502, one or more wires 522, one or more Ethernet cables 516, and one or more high voltage ultrasound cables 514. The cassette 504 includes the multipoint controller units 512 and sets of ultrasonic probes 510.

The PLC 501 is connected to the one or more ultrasonic power supplies 502 via the one or more wires 522. The wires 522-1, 522-2, . . . 522-M can be an industrial bus or discrete I/O connections for allowing communication between the PLC 501 and each of the power supplies 502-1, 502-2, . . . 502-M. The Ethernet cables 516-1, 516-2, . . . 516-M allow communication between each of the ultrasonic power supplies 502-1, 502-2, . . . 502-M and the multipoint controller units 512-1, 512-2, . . . 512-M. The cassette 504 includes one or more ultrasonic power ports 518-1, 518-2, . . . 518-M for receiving the wires 512-1, 512-2, . . . 512-M. The cassette 504 also includes one or more RJ-45 couplers 520-1, 520-2, . . . 520-M for receiving the Ethernet cables 516-1, 516-2, . . . 516-M.

Each set of probes 510-1, 510-2, . . . 510-M includes at least one probe. Each set of probes 510-1, . . . 510-M does not necessarily include a same number of probes. For example, the set of probes 510-1 can have eight probes while the set of probes 510-2 can have ten probes. Each probe within the set of probes 510 includes distance sensors for providing distance information. The distance information is carried on sensor buses 508 from a respective set of probes 510 to a respective multipoint controller unit 512. For example, if the set of probes 510-1 contained six probes, then each of the six probes will generate distance information carried on sensor bus 508-1 to the multi-channel distance input port of the multipoint controller unit 512-1.

Comparing FIG. 5 to FIG. 2, some architectural differences are apparent. In FIG. 5, the PLC 501 is all digital, and the multipoint controller units 512 are able to process analog information. While in FIG. 2, the PLC with analog I/O cards 201 is not all digital but includes custom analog I/O cards for processing analog information, and the multiple probe controller 212 is all digital. In FIG. 5, the multipoint controller units 512 process the distance information provided by the sets of probes 510 while in FIG. 2, the PLC with analog I/O cards 201 processes the distance information provided by the sets of probes 210. The sensor buses 508-1, 508-2, . . . 508-M are much shorter than the sensor cables 208. As such, distance information can be provided to the multipoint controller units 512 much quicker than the PLC with analog I/O cards 501 due to slow I/O cards processing time. Furthermore, since the distance information are analog signals, longer cables being routed from the cassette to the base require electromagnetic shielding to protect signal integrity of the distance information. By having the multipoint controller units 512 process the distance information, wiring and electromagnetic requirements are alleviated. Also the embodiment of FIG. 2 requires additional quick disconnects (e.g., the quick disconnect 219) for analog distance sensors (e.g., the analog distance sensors 210) between the base 206 and each cassette (e.g., the cassette 204).

Due to the architectural changes, responsibilities of the PLC with analog I/O cards 201 is different from responsibilities of the PLC 501 during a welding process. The PLC 501 informs the ultrasonic power supplies 502, via the wires 522, that one selected probe within the set of probes 510 should be active. A corresponding one of the ultrasonic power supplies 502 responsible for the selected probe then updates the signals on a respective Ethernet cable 516 connected to a respective multipoint controller unit 512 so that the one selected probe is selected by the logic in the respective multipoint controller unit 512.

The PLC 501 then sends a signal to the corresponding one of the ultrasonic power supplies 502 to start the welding cycle and then waits for the welding cycle to finish. Once the welding cycle finishes, data from the corresponding one of the ultrasonic power supplies 502 can be read by the PLC 501. The welding process can then continue with a different probe output selection. The PLC 501 is not responsible for monitoring distance information, hence, the welding process can be controlled by the respective multipoint controller unit 512 monitoring the distance information without incurring delays from the PLC 501.

Embodiments of the disclosure provide several advantages. For example, Ethernet style communication removes the need for customized quick-change connectors (e.g., the quick-change connectors 220 and the quick disconnect 219 in FIG. 2). Custom quick-change connectors can be replaced with inexpensive off the shelf RJ-45 couplers (e.g., the RJ-45 couplers 520 in FIG. 5). Wiring costs can be significantly reduced by using off-the-shelf shielded CAT-5 cables and avoiding customized cables. Using the CAT-5 cables and the RJ-45 couplers can also reduce risk of mis-wiring signals. Using these cables and couplers can also reduce risk of improper cable shielding from a customized cable. Since Ethernet communication uses differential signals passed over twisted pairs of wires, electronic noise generated by high voltage signals that might be nearby has much less effect on communication between power supplies (e.g., the ultrasonic power supplies 502 in FIG. 5) and multipoint controller units (e.g., the multipoint controller units 512 in FIG. 5), according to some embodiments of the disclosure.

Ethernet hardware can be used with a communication protocol transparent to other protocols such as TCP/IP and industrial automation protocols. Multipoint controller units with Ethernet can run concurrently on the same physical network with a PLC, ultrasonic power supplies, and other devices. The protocol data can be transmitted using custom Ethernet frames that avoid collision with existing network protocols residing on a same physical network. The communication protocol can also provide for error checking which is unavailable with discrete wiring provided in FIG. 2.

Ethernet style communication allows for more feedback information about a state of an multipoint controller unit (e.g., the multipoint controller unit 512-1 of FIG. 5) to be passed to an ultrasonic power supply (e.g., the ultrasonic power supply 502-1) and vice versa, without a need for an unwieldy and expensive cable (e.g., the customized cable 216 of FIG. 2) that would be required for discrete connections. Ethernet style communication can support port forwarding which can allow multiple multipoint controller units to be daisy chained without the use of an external switch. That way, in a network with multiple multipoint controller units and power supplies, one switch port can be used to communicate with all multiple controller units.

Figure 6:
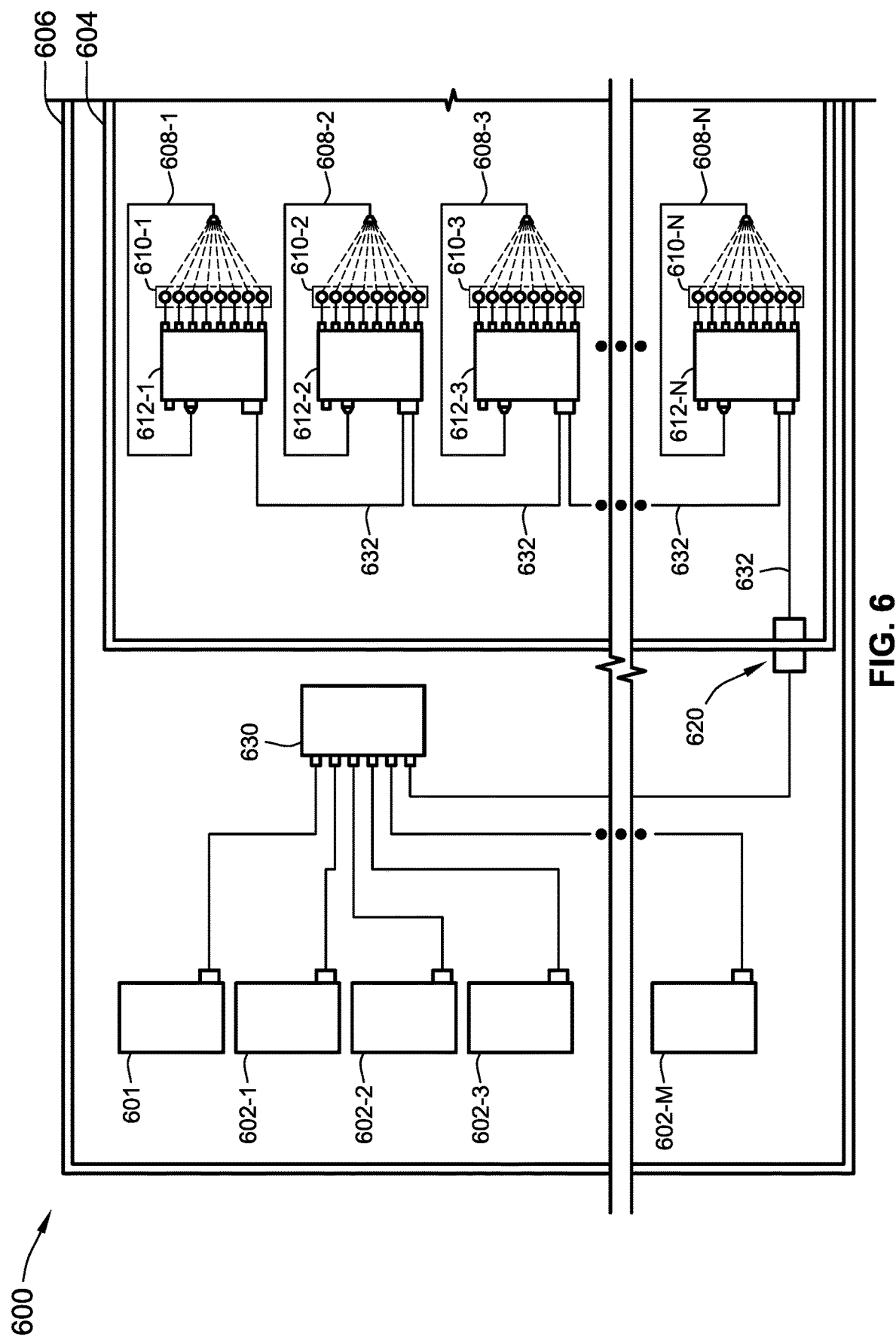
FIG. 6 is a schematic of a base and cassette style machine with multipoint controller units connected in a daisy chain configuration, according to an embodiment of the disclosure.

FIG. 6 is a schematic of a base and cassette style machine 600 with multipoint controller units 612 connected in a daisy chain configuration, according to an embodiment of the disclosure. The base and cassette style machine 600 includes a base 606 and a cassette 604 with the base 606 including a PLC 601, one or more ultrasonic power supplies 602, and an Ethernet switch 630. The cassette 604 includes multipoint controller units 612 and sets of probes 610. The sets of probes 610 include distance sensors for providing distance information to the multipoint controller units 612 via the sensor busses 608. The high voltage ultrasound cables from the ultrasonic power supplies 602 for providing ultrasonic power to the sets of probes 610 are not shown in FIG. 6.

The PLC 601 (similar to or the same as the PLC 501) is connected to the Ethernet switch 630. The ultrasonic power supplies 602-1, 602-2, . . . 602-M are also connected to the Ethernet switch 630. An RJ-45 coupler 620 of the cassette 604 is also connected to the Ethernet switch 630. The Ethernet switch 630 facilitates communication between the PLC 601 and each of the ultrasonic power supplies 602-1, 602-2, 602-3, . . . 602-M. The Ethernet switch 630 also facilitates communication between the ultrasonic power supplies 602-1, 602-2, 602-3, . . . 602-M and the multipoint controller units 612-1, 612-2, 612-3, . . . 612-N.

The multipoint controller units 612-1, 612-2, 612-3, . . . 612-N are arranged in a daisy chain configuration. In an embodiment, each multipoint controller unit 612-2, 612-3, . . . 612-N includes at least two Ethernet ports to facilitate connecting the multipoint controller units in a daisy chain configuration. One or more Ethernet cables 632 are used in connecting the multipoint controller units 612 in the daisy chain configuration. The daisy chain configuration allows the multipoint controller units 612 to share the RJ-45 coupler 620 of the cassette 604. As shown in FIG. 6, using an Ethernet switch (e.g., the Ethernet switch 630) in the machine base will allow multiple power supplies to control multiple multipoint controller units 612 with a single connection between the base and the cassette.

Figure 7A:
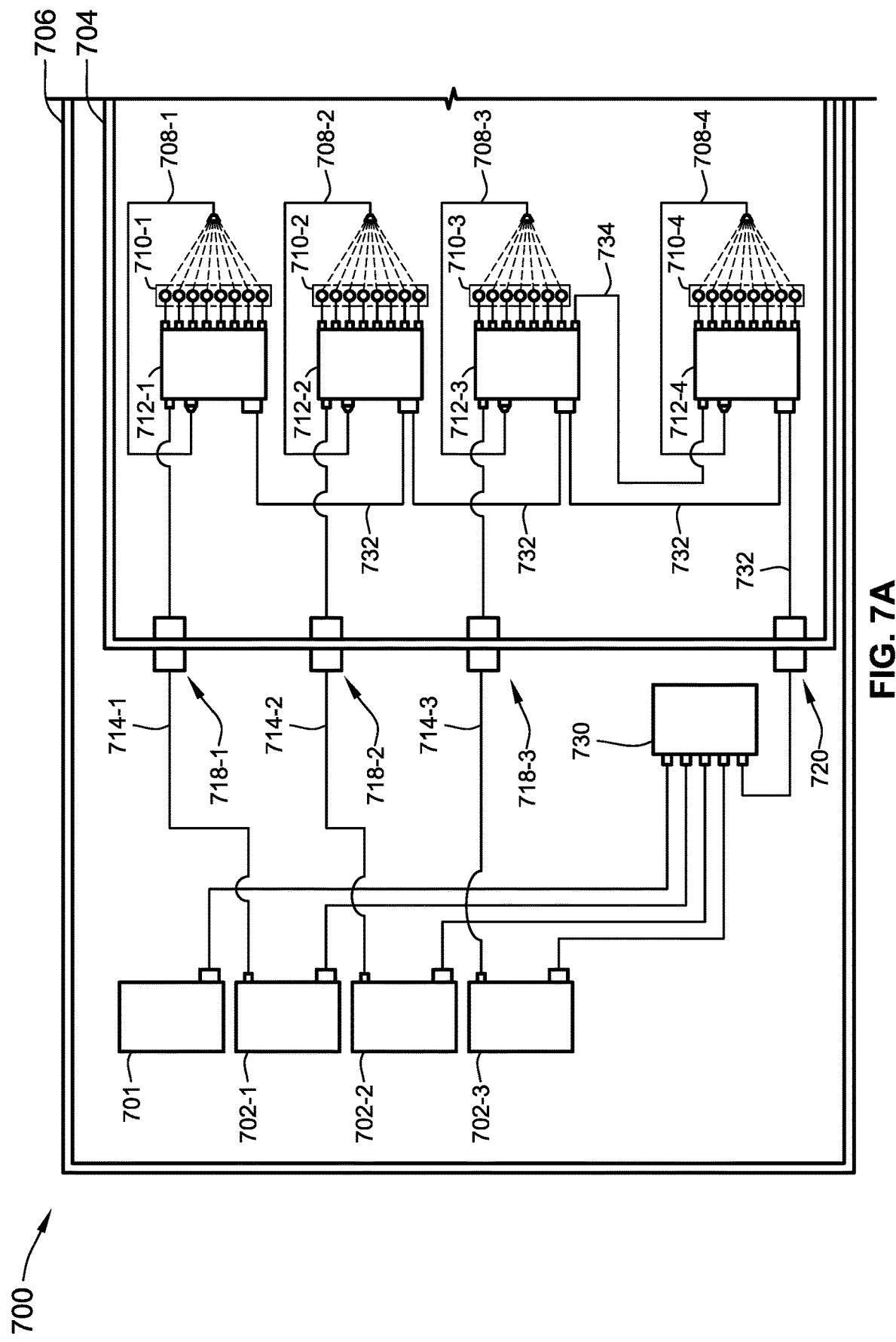
FIG. 7A is a schematic of a base and cassette style machine with two multipoint controller units paired to one power supply, according to an embodiment of the disclosure.

In some embodiments, multiple ultrasonic power supplies and multiple multipoint controller units can exist on the same network without interfering with one another. Specific multipoint controller units can be paired with specific power supplies. A power supply can be paired with multiple multipoint controller units which will switch the ultrasound signal in a daisy-chained fashioned, expanding the total probe selections available to the power supply. FIG. 7A is a schematic of a base and cassette style machine 700 with two multipoint controller units 712-3 and 712-4 paired to one power supply 702-3, according to an embodiment of the disclosure.

The base and cassette style machine 700 includes a PLC 701 and three power supplies 702-1, 702-2, and 702-3. The PLC 701 and the three power supplies 702 are connected to an Ethernet switch 730. The Ethernet switch 730, similar to Ethernet switch 630, facilitates communication between the three power supplies 702 and the PLC 701. The Ethernet switch 730 also facilitates communication between each of the three power supplies 702 and each of the multipoint controller units 712-1, 712-2, 712-3, and 712-4, via the RJ-45 coupler 720. Each respective multipoint controller unit 712 controls ultrasonic power provided to a set of probes 710. The set of probes 710 provide distance information to the multipoint controller units 712 via the sensor busses 708. Similar to FIG. 6, the multipoint controller units 712 are daisy chained using Ethernet cables 732.

To provide ultrasonic power to the set of probes 710, the power supplies 702 have high voltage connections to the multiport controller units 712 via wires 714. The power supply 702-1 is connected to the multipoint controller unit 712-1 via the wire 714-1 and a power port 718-1. The power supply 702-2 is connected to the multipoint controller unit 712-2 via the wire 714-2 and a power port 718-2. The power supply 702-3 is connected to the multipoint controller unit 712-3 via the wire 714-3 and a power port 718-3. The power supply 702-3 is also connected to the multipoint controller unit 712-4 via a daisy chained power configuration between the multipoint controller unit 712-3 and the multipoint controller unit 712-4. The daisy chained power configuration allows ultrasonic power to flow from the power supply 702-3 to the multipoint controller unit 712-3, then from the multipoint controller unit 712-3 via a wire 734 to the multipoint controller unit 712-4.

In FIG. 7A, the power supply 702-3 can provide ultrasonic power to the set of probes 710-3 and 710-4. The power supply 702-3 can also communicate with both the multipoint controller units 712-3 and 712-4 via the RJ-45 coupler 720. As such, the power supply 702-3 can be paired to more than one multipoint controller unit 712. Although a one-to-two pairing is shown as an example in FIG. 7A, a power supply can be paired with more than two multipoint controller units.

Figure 7B:
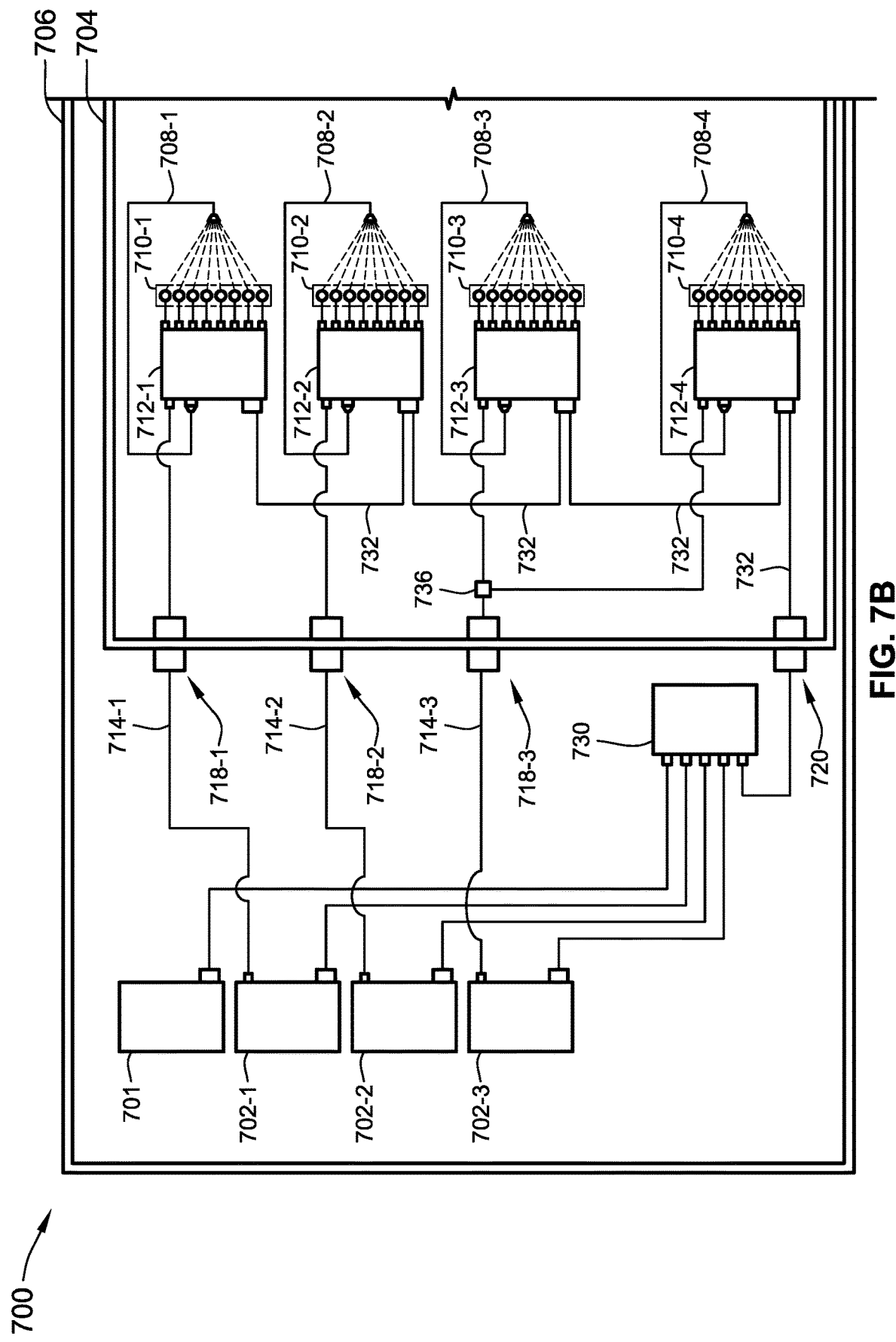
FIG. 7B is a schematic of a base and cassette style machine with two multipoint controller units paired to one power supply, according to an embodiment of the disclosure.

Similar to FIG. 7A, FIG. 7B is a schematic of the base and cassette style machine 700 with two multipoint controller units 712-3 and 712-4 paired to one power supply 702-3, according to an embodiment of the disclosure. Instead of using a daisy chain configuration as in FIG. 7A, FIG. 7B splits the ultrasonic power from the power supply 702-3 using a high voltage tee 736. The high voltage tee 736 acts as a power splitter that allows the power supply 702-3 to provide power to the set of probes 708-3 via the multipoint controller unit 712-3 and also provide power to the set of probes 708-4 via the multipoint controller unit 712-4.

Embodiments of the disclosure provide several advantages. Multi-channel analog inputs located in the multipoint controller units (e.g., the multipoint controller units 712 of FIG. 7A) allow welding using distance or position sensors without costly analog I/O cards for the PLC. In a base and cassette style machine, multipoint controller units can usually be located close to the ultrasonic probes, so having the analog distance inputs in the multipoint controller units can significantly reduce machine wiring costs and risk of induced electrical noise.

Having the analog distance inputs in the multipoint controller units reduces the distance that the distance information from the analog distance sensors travels. As such, welding using the distance information can be much more accurate due to the multipoint controller units having a much faster sampling rate than most PLCs. The rate at which a PLC can sample distance information from the analog distance sensors can be dependent on scan time, which is determined by processor speed, number of program steps, number of I/Os, and so on. The accuracy of a trigger position for starting the welding process and accuracy of a weld end position or distance is directly affected by the scan time. Scan time for modern PLCs is often from several milliseconds up to 20 ms.

Communication protocol using Ethernet cable can be custom designed for the multipoint controller units to exhibit custom frame types with messages specific to the multipoint controller units. The communication protocol enables for remote pairing of a power supply to a multipoint controller unit to form a master-slave control relationship that is protected from outside influence using shared secrets established during the pairing operation. The pairing operation forms a logical control channel between a respective power supply and a respective multipoint controller unit, emulating discrete physical I/O. The physical network topology between a paired multipoint controller unit and a power supply can change without affecting the logical connection. That is, for example, consider that the ultrasonic power supplies 602-2 and 602-3 were logically paired to the multipoint controller units 612-2 and 612-3, respectively, and positions of the multipoint controller units 612-2 and 612-3 were swapped in the daisy chain connection. Even through there has been a change to the physical configuration of the multipoint controller units 612-2 and 612-3, the multipoint controller units 612-2 and 612-3 would keep their paired logical connection to the power supplies 602-2 and 602-3, respectively.

The communication protocol can support both a simple tool free "one button" paring operation and a more comprehensive operation using a personal computer (PC) utility. The "one button" paring operation can be used for quick field replacement of a known bad unit. The PC utility supported operation can provide detailed pairing status and system identification information (such as model number, serial number, firmware versions) useful for debugging tasks. Both the "one button" pairing option and the PC utility option are simpler than any PLC development tool, thus enabling maintenance personnel with lower levels of training than what might be required by a PLC based network.

In an embodiment, each multipoint controller unit (e.g., the multipoint controller units 612) can be in one of three states with respect to the communication protocol. The three states include an unpaired state ("UNPAIRED" state), a paired but unconnected state ("UNCONNECTED" state), and a paired and connected state ("CONNECTED" state). The real time control and status information is exchanged only in the CONNECTED state. Each paired multipoint controller unit should be in the CONNECTED state to be operational.

In an embodiment, a paired multipoint controller unit (e.g., the multipoint controller units 612) can detect incorrect wiring of the high voltage ultrasound cables between the power supply and the multipoint controller unit. For example, when the multipoint controller unit 612-2 is paired to the ultrasonic power supply 602-1, the multipoint controller unit 612-2 is in communication with the ultrasonic power supply 602-1. During a welding process, if the ultrasonic power supply 602-1 indicates that it is providing ultrasonic power to the multipoint controller unit 612-2 but the multipoint controller unit 612-2 does not receive any ultrasonic power at its ultrasonic power input (e.g., the ultrasonic power input 364), the multipoint controller unit 612-2 can provide a signal for stopping power delivery from the ultrasonic power supply 602-1. The multipoint controller unit 612-2 can determine that ultrasonic power output from the power supply 602-1 is not correctly wired to the multipoint controller unit 612-2.

Figure 8:
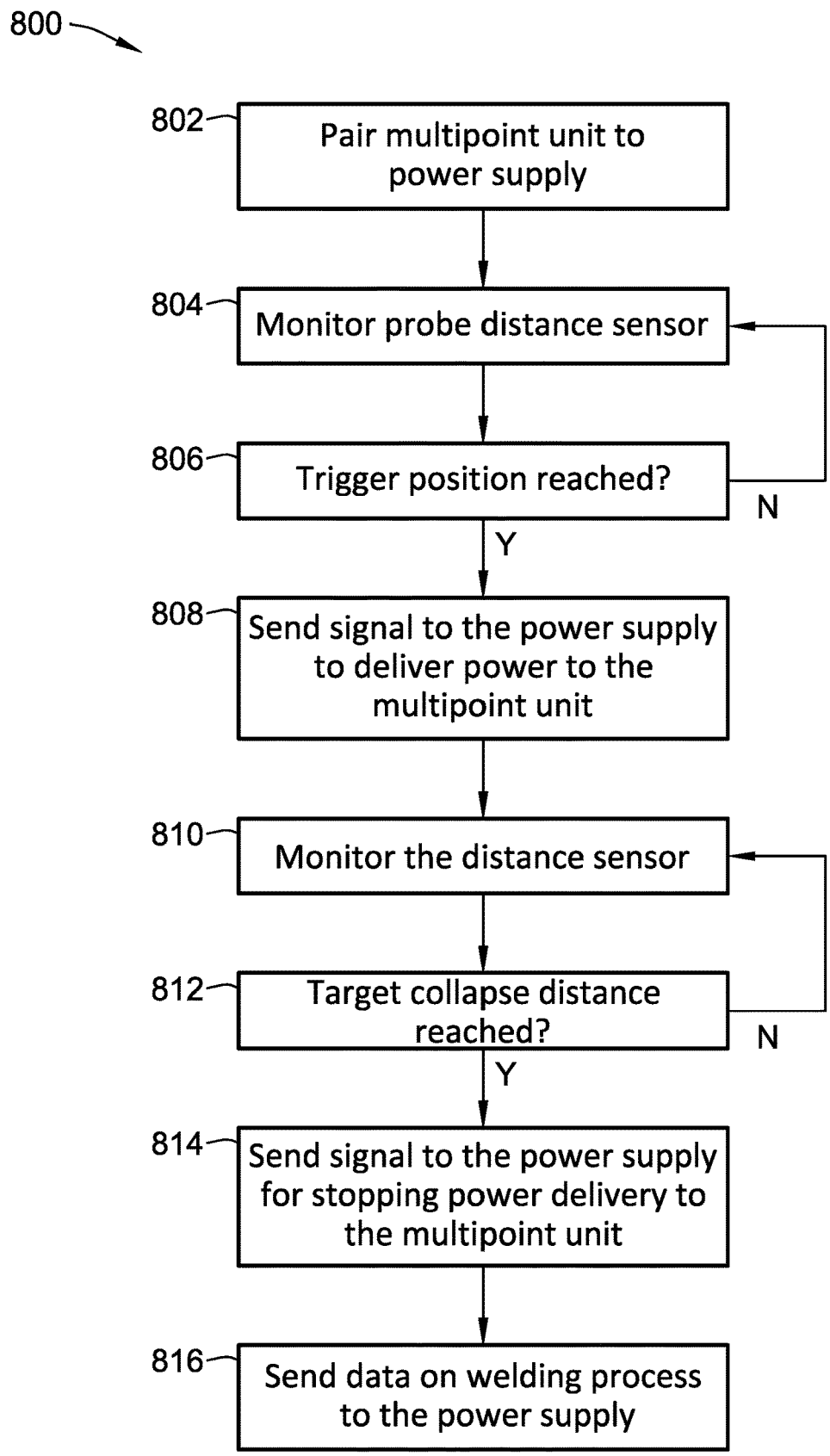
FIG. 8 is a flow diagram illustrating a welding process using a multipoint controller unit according to an embodiment of the disclosure.

Multipoint controller units according to embodiments of the disclosure being used in base and cassette style machines can allow welding to start and stop using distance information. In some embodiments, the distance information can be used to determine a quality of the weld. FIG. 8 is a flow diagram illustrating a welding process using a multipoint controller unit (e.g., the multipoint controller unit 612-1) according to an embodiment of the disclosure. At step 802, the multipoint controller unit is paired to a power supply. For example, the multipoint controller unit 612-1 is paired to the power supply 602-1 using either a "one button" pairing or a PC utility pairing according to embodiments of the disclosure.

At step 804, the multipoint controller unit 612-1 monitors distance information received from a selected probe in the set of probes 610-1. At step 806, the multipoint controller unit 612-1 determines via the distance information whether a trigger position has been reached. The trigger position is a distance separating the selected probe from a particular location on the part being welded. The probe or the part is continuously being moved until the trigger position is reached. If the trigger position is not met, the distance information is monitored at step 804. Trigger by power method also could be used to start ultrasonic welding.

If the trigger position is met, then at step 808, the multipoint controller unit 612-1 sends a signal to the power supply 602-1 to deliver ultrasonic power to the multipoint controller unit 612-1 for the selected probe. The signal is sent through Ethernet via the Ethernet switch 630.

As power is delivered, the distance information from the selected probe in the set of probes 610-1 is monitored. As the part is being welded, a target collapse distance is checked for at step 812. If the target collapse distance is not reached, then the distance information is continuously monitored at step 810.

If the target collapse distance is reached, then at step 814, the multipoint controller unit 612-1 sends a signal to the power supply 602-1 to stop delivering ultrasonic power to the multipoint controller unit 612-1. The signal is sent through Ethernet, via the Ethernet switch 630.

At step 816, the multipoint controller unit 612-1 can send data on the welding process to the power supply. The data can include a quality status of the completed weld.

While the present disclosure has been described with reference to one or more particular embodiments and implementations, those skilled in the art will recognize that many changes may be made thereto without departing from the spirit and scope of the present disclosure. Each of these embodiments and implementations and obvious variations thereof is contemplated as falling within the spirit and scope of the present disclosure, which is set forth in the claims that follow.

What is claimed is:

1. A system for providing power to more than one ultrasonic welding probe from M power supplies, the system comprising:
   N multipoint units, each of the N multipoint units including:
      a housing,
      a plurality of analog or digital inputs configured to carry distance information regarding probe distance of a plurality of ultrasonic welding probes,
      a dedicated high voltage input connector connectable via a high voltage cable to a dedicated high voltage output connector of one of the M power supplies,
      at least one Ethernet port, and
      a microcontroller, configured to
         direct power from the dedicated high voltage input connector to a corresponding one of the plurality of ultrasonic welding probes, and
         sample the distance information of the plurality of ultrasonic welding probes at a rate of at least once per millisecond; and
   a base housing the M power supplies, wherein M and N are both integers greater than or equal to 1,
   each of the N multipoint units being interconnected by Ethernet to form a network having as components the N multipoint units and the M power supplies such that (i) each of the N multipoint units is paired with a different one of the M power supplies in the network, avoiding interference between any of the N multipoint units and any of the M power supplies and (ii) a first one of the N multipoint units is paired with a first one of the M power supplies in the network, the microcontroller of the first one of the N multipoint units being configured to:
      receive a signal from the first one of the M power supplies via the network, the signal indicating that the first one of the M power supplies is providing power to the dedicated high voltage input connector of the first one of the N multipoint units,
      detect a power level at the dedicated high voltage input connector of the first one of the N multipoint units, and
      responsive to the detected power level being below a threshold, generate an error signal for the first one of the M power supplies to stop providing power.

2. The system of claim 1, wherein a first multipoint unit of the N multipoint units further includes a button configured to form a pairing between the first multipoint unit and a first one of the M power supplies.

3. The system of claim 1, wherein a first multipoint unit of the N multipoint units further includes a universal serial bus (USB) port, the USB port configured to receive signals from a computing device for forming a pairing between the first multipoint unit and a first one of the M power supplies.

4. The system of claim 1, wherein the pairing between the first one of the M power supplies and the first one of the N multipoint units forms a logical control channel between both such that a physical change in a physical topology of the network does not disrupt the logical control channel between the first one of the M power supplies and the first one of the N multipoint units.

5. The system of claim 2, wherein the N multipoint units and the M power supplies communicate according to a custom communication protocol that supports a pairing operation and allows control status and information to be exchanged.

6. The system of claim 5, wherein for a first multipoint unit in the N multipoint units, the at least three states include a first state indicating that the first multipoint unit is not paired with any of the M power supplies, a second state indicating that the first multipoint unit is paired to a first power supply in the M power supplies but is not connected to the first power supply, and a third state indicating that the first multipoint unit is paired with the first power supply and is connected to the first power supply.

7. The system of claim 1, further comprising:
   an Ethernet switch configured to physically interface the N multipoint units with a programmable logic controller (PLC).

8. The system of claim 7, wherein:
   the at least one Ethernet port of each of the N multipoint units is at least two Ethernet ports; and
   the Ethernet switch is further configured to receive N Ethernet cables from the N multipoint units.

9. The system of claim 7, wherein:
   the at least one Ethernet port of each of the N multipoint units is at least two Ethernet ports; and
   the Ethernet switch is further configured to interface the M power supplies with the N multipoint units, the N multipoint units being arranged in the network in a daisy chained manner such that the Ethernet switch receives a single Ethernet cable from one of the N multipoint units.

10. The system of claim 1, wherein the microcontroller of a first multipoint unit in the N multipoint units is further configured to:
   compare distance information of a corresponding one of the plurality of ultrasonic welding probes to determine whether the distance information indicates that a threshold has been violated; and
   generating an error signal to stop a welding process based on the threshold being violated.

11. The system of claim 10, wherein the error signal is generated after the welding process has begun.

12. A method for providing power from a first power supply of M power supplies to more than one ultrasonic welding probe coupled to a first multipoint unit of N multiport units, the method comprising:

pairing the first multipoint unit to the first power supply, wherein each of the N multipoint units includes at least one Ethernet port for connecting the N multiport units to the M power supplies in a network;

receiving, via a plurality of analog or digital inputs of the first multipoint unit, distance information regarding probe distance of a plurality of ultrasonic welding probes;

receiving, via a dedicated high voltage input connector of the first multipoint unit, power from the first power supply, the dedicated high voltage input connector connectable via a high voltage cable to a dedicated high voltage output connector of the first power supply;

directing, via a microcontroller of the first multipoint unit, the power from the first power supply to a corresponding one of the plurality of ultrasonic welding probes;

sampling, via the microcontroller, the distance information of the corresponding one of the plurality of ultrasonic welding probes at a rate of at least once per millisecond;

comparing, by the microcontroller, the sampled distance information to determine whether a threshold has been violated; and generating, by the microcontroller, an error signal to stop a welding process from beginning based on the threshold being violated, the error signal being generated before the welding process has begun, wherein M and N are both integers greater than or equal to 1.

13. The method of claim 12, wherein prior to pairing the first multipoint unit to the first power supply, the method further comprises receiving a pair signal from a button of the first multipoint unit, the pair signal initiating the pairing between the first multipoint unit and the first power supply.

14. The method of claim 12, wherein pairing the first multipoint unit to the first power supply comprises:

receiving, via a universal serial bus (USB) port of the first multipoint unit, signals from a computing device, the received signals including a configuration for forming the pairing between the first multipoint unit and a first power supply.

* * * * *